Figure 1:
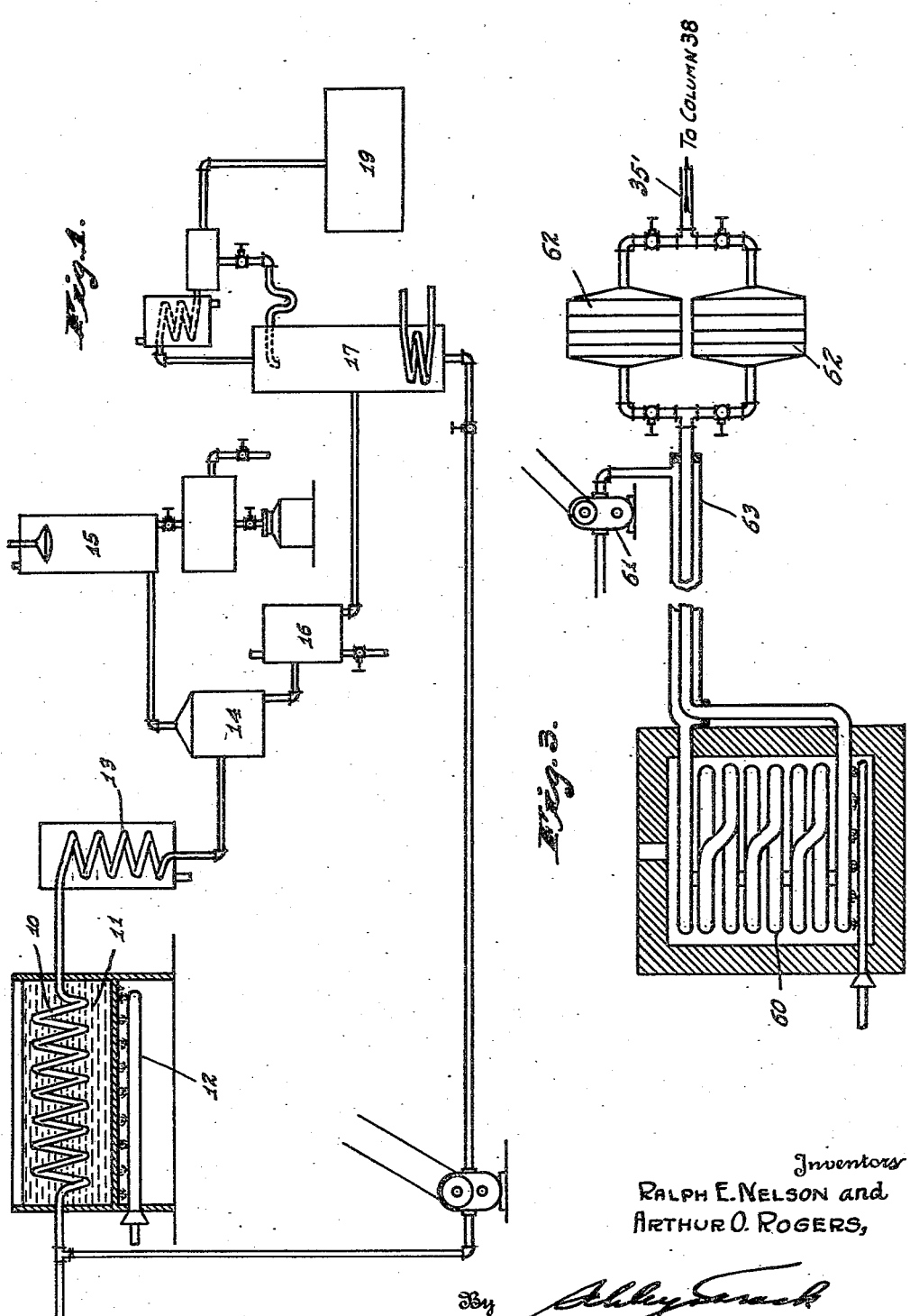

Nov. 17, 1936.   R. E. NELSON ET AL   2,061,519
PRODUCTS DERIVED FROM TRICHLOROISOBUTANE AND PROCESS OF PRODUCING THEM
Filed Nov. 6, 1933   2 Sheets—Sheet 2

Fig. 2.

Inventors
Ralph E. Nelson and
Arthur O. Rogers,
By
Attorneys

Patented Nov. 17, 1936

2,061,519

UNITED STATES PATENT OFFICE 2,061,519

PRODUCTS DERIVED FROM TRICHLOROISO BUTANE AND PROCESS OF PRODUCING THEM

Ralph E. Nelson and Arthur O. Rogers, West Lafayette, Ind., assignors to Purdue Research Foundation, West Lafayette, Ind., a corporation of Indiana Application November 6, 1933, Serial No. 696,798

9 Claims. (Cl. 260—156)

This invention relates to substances derivable from certain trichloroisobutanes and to processes by which such substances may be produced.

In the thermal or photo-chemical chlorination of hydrocarbons, substitution of chlorine atoms for hydrogen atoms takes place progressively with the result that in any process where conditions are such that chlorination is not carried to the ultimate limit the immediate product of the chlorination step comprises a mixture of substances of different degrees of substitution. For example, in the process of producing commercially valuable 1,3-dichloro-2-methylpropane by the chlorination of isobutane, as set forth in United States Letters Patent No. 2,004,072 which issued June 4, 1935 on the application of Henry B. Hass and Earl T. McBee, chlorides other than the desired dichloride are concurrently formed.

In the production by the Hass and McBee process of the dichloride mentioned above, the mixture of organic chlorides resulting from the chlorination step is separated into three fractions of successively higher boiling points. The fraction of lowest boiling point consists of monochlorides, and can be recycled; the intermediate fraction is composed essentially of the desired dichloride; while the fraction of highest boiling point contains a trichloroisobutane as its principal component, and is a by-product.

We believe this trichloroisobutane to be 1,2,3-trichloro-2-methylpropane, since its observed boiling point (161.7–163° C.) agrees well with that (163.5–164.0/772 mm.) given in the literature for this particular trichloride. The only other trichloroisobutane which might have a boiling point in this neighborhood is 1,1,3-trichloro-2-methylpropane. The general rules covering the chlorination of hydrocarbons make it appear highly improbable that the latter compound is present in large amount, since chlorine only rarely substitutes twice on the same carbon atom except in cases where selectivity is impossible. Furthermore, the tertiary hydrogen atom is substituted under most conditions at a more rapid rate than the primary hydrogen atoms; and it would be very unusual for the tertiary hydrogen atom to escape substitution in a succession of three chlorinations.

The primary object of our invention is to utilize this by-product trichloroisobutane in the production of 3-chloro-2-methylallyl alcohol, a substance which, among other uses, finds application as a solvent in cellulose-ester lacquers.

We may produce the desired 3-chloro-2-methylallyl alcohol from the trichloroisobutane by either of two general methods. In the first method, which is a two-step process, the trichloride is first pyrolyzed to split off a hydrogen atom and a chlorine atom in the form of hydrogen chloride, and the resulting dichloroisobutene is then subjected to hydrolysis to form the desired alcohol. The two steps are respectively represented by the following equations:

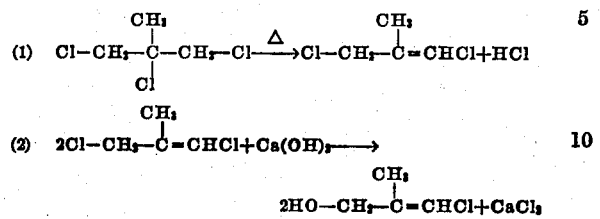

In the second general process which we may use in producing the desired alcohol, the trichloroisobutane is subjected to treatment, as with the hydroxide of an alkali or alkaline earth metal, designed to effect simultaneously a loss of hydrogen and chlorine atoms in the form of hydrogen chloride and the replacement of one of the remaining chlorine atoms by a hydroxyl group. An example of this single-step process is represented by the following equation:

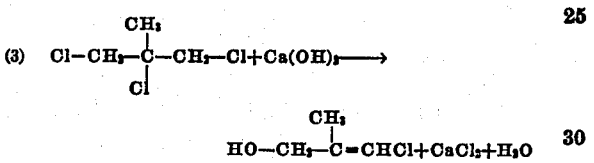

The accompanying drawings illustrate diagrammatically apparatus in which the two general processes contemplated by our invention may be carried out: Fig. 1 illustrates apparatus for obtaining dichloroisobutene; Fig. 2 shows apparatus in which 3-chloro-2-methylallyl alcohol can be obtained either from dichloroisobutene or directly from trichloroisobutane; and Fig. 3 illustrates a modification of a part of the apparatus shown in Fig. 2.

The first, or two-step, process mentioned above may be carried out in a number of ways. The method contemplated for the apparatus illustrated in the drawings comprises vaporizing trichloroisobutane and passing it through a coil 10 heated to a temperature such that the desired pyrolysis will result. This heating of the tube 10 is conveniently accomplished by placing it in a bath 11 of molten salts, the temperature of which is maintained by any suitable means, such as a gas burner 12.

The temperature at which the tube 10 is maintained may vary throughout a considerable range, say between 250° C. and 700° C. The length of time during which the gaseous trichloride is subjected to the pyrolyzing temperature will vary oppositely to the temperature, longer exposure times being required at lower temperatures for a given degree of completion of the reaction. We have found that an exposure time of four seconds at about 550° C. will produce a reaction about 50% complete. The 50% completion of the reaction produced by the temperature and exposure time indicated is in general satisfactory, but we do not limit ourselves to it nor to the exact exposure time and temperature by which it is produced.

Obviously, the tube 10 should be constructed of some suitable material capable of resisting the action of hydrogen chloride under the conditions existing within it. Further, the material of which the tube is formed should not possess too great an activity as a catalyst for the polymerization of dichloroisobutene. Glass, silica, or steel are suitable materials, but the latter, while capable of acting as a catalyst to promote pyrolysis, also tends to aid the polymerization of the unsaturated chloride. If desired, there may be placed in the tube 10 one or more catalysts, such as the chlorides of barium, calcium, zinc, or mercury, which promote the loss of hydrogen chloride from chlorinated hydrocarbons.

Immediately after pyrolysis the gases are cooled, as by passing them through a cooling coil 13. The step of cooling should follow the pyrolysis immediately in order to avoid as far as possible any recombination between the hydrogen chloride and the dichloroisobutene. During the cooling step, the dichloroisobutene and the unchanged trichloride will be largely condensed, while the hydrogen chloride remains gaseous.

The mixture of compounds emerging from the cooling coil 13 is passed through a separator 14 from which the gaseous products flow to an absorber 15 where the hydrogen chloride is dissolved in water and recovered together with a small quantity of dichloroisobutene and other organic compounds.

The liquid components, consisting essentially of a mixture of dichloroisobutene and trichloroisobutane, discharged from the separator 14 are passed through a washer 16 where they are washed with sodium carbonate solution to remove any traces of occluded acid, and are then discharged into a continuous rectifying column 17 by the action of which the dichloroisobutene and the trichloroisobutane are separated. From the rectifying column 17, the trichloride, which is of higher boiling point, is recycled, while the dichloroisobutene may be discharged into a storage tank 19 in anticipation of further processing. This completes the first step of the process.

In hydrolyzing the dichloroisobutene, it is placed, together with water and, preferably, a suitable base, in a digester 30 associated with which there are heating means, such as a steam coil 31, and an agitator, such as a propeller 32. The base used may be calcium hydroxide, and may be supplied to the digester, together with the necessary water, in the form of milk of lime from a slaking tank 33.

In the digester 30, the dichloroisobutene is hydrolyzed to form the desired alcohol in the manner represented by Equation 2 above. During hydrolysis, the digester may be maintained at a temperature of 97° C. at which temperature good yields will be obtained in from four to five hours. The relative proportions of milk of lime and dichloroisobutene in the digester are controlled by regulating the rate at which the materials are supplied. We have found that a proportion of about five volumes of milk of lime to one of dichloroisobutene gives satisfactory results, enough calcium hydroxide being present to keep the solution thoroughly saturated at all times.

From the digester there is withdrawn into a thickener 35 an emulsified mixture containing the desired 3-chloro-2-methylallyl alcohol, water, calcium hydroxide, calcium chloride, unreacted dichloroisobutene, and other organic by-products. In the thickener 35, this mixture separates into two layers, the upper layer containing water, calcium chloride, and the alcohol, with small quantities of dichloroisobutene, and the lower layer containing most of the dichloroisobutene. The calcium hydroxide collects for the most part at the bottom of the upper layer.

From the lower part of the thickener a pipe 36 leads to the digester 30, and through it are returned the separated dichloroisobutene, the calcium hydroxide, and a sufficient quantity of the upper, or aqueous, layer to keep the calcium hydroxide in suspension. From the top of the thickener, the upper layer is withdrawn through a pipe 35' and passed to an intermediate point of a continuous rectifying column 38 from the bottom of which a solution of calcium chloride, relatively free from organic chlorides, is withdrawn.

The overhead product from the column 38 consists of a mixture of water and 3-chloro-2-methylallyl alcohol with a trace of dichloroisobutene. This mixture, after condensing, is passed through a wier-box 39 in which it is separated into reflux and take-off portions, the latter of which flows to a decanter 45 in which it separates into two layers, an upper layer consisting of water saturated with organic chlorides, and a lower layer consisting of organic chlorides saturated with water. The upper layer is returned through a pipe 46 to the column 38 immediately above that plate upon which the liquid has a composition most nearly approaching that of the returned solution. This plate will be located between the feed plate and the top plate of the column.

The lower layer from the decanter 45 is passed to an intermediate point of a second rectifying column 47 from the bottom of which a commercial grade of the desired 3-chloro-2-methylallyl alcohol is withdrawn, as into a suitable storage tank 48.

The overhead product from the rectifying column 47 is condensed and passed through a wier-box 47' in which it is divided into reflux and take-off portions. The latter flows into a second decanter 49 in which it separates into an upper layer consisting principally of water with some 3-chloro-2-methylallyl alcohol and dichloroisobutene and a lower layer consisting principally of the organic products with a small amount of water. The upper layer passes through a pipe 50 to the pipe 46 and is returned to the first rectifying column 38, while the lower layer is returned to the digester 30, through pipe 51.

The single-step process, in which the desired 3-chloro-2-methylallyl alcohol is obtained directly from the trichloroisobutane without initial pyrolysis, may be carried out in that portion of the apparatus illustrated in Fig. 2. In this process the trichloroisobutane is placed in the digester 30 with a suitable quantity of milk of lime or other mixture of basic material and water. If milk of lime is used, it may be present in the proportion of five volumes of milk of lime to one volume of the trichloride, as before. By maintaining the digester at a temperature of approximately 180° C., a fairly complete reaction can be obtained within a period of less than an hour in a batch operation.

In the thickener 35, into which the materials are withdrawn after the treatment in the digester 30, the materials separate into two layers, the upper layer, which contains the desired alcohol passing to the rectifying column 38 as before, and the lower layer being returned through the pipe 36 to the digester. The bulk of the unconverted trichloroisobutane will be returned to the digester with the other components of the lower layer in the thickener 35. Any trichloroisobutane which escapes returns to the digester by this route will ultimately find its way to the top of the rectifying column 47 and will be separated in the decanter 49 and returned to the digester through pipe 51.

It is possible to carry the hydrolysis of the trichloroisobutane or dichloroisobutene to substantial completion, in which event the thickener 35 may be eliminated. If this is done, we prefer to use instead of the digester 30 a series of nested spiral pipe coils 60, as shown in Fig. 3. These coils are heated, as by direct firing. The dichloroisobutene (or trichloroisobutane, in the single-step process) is mixed with milk of lime and forced successively through the heated coils 60 as by a pump 61. The total length of the heated pipe coils 60 is such that at the conditions of temperature and rate of flow obtaining within them the hydrolysis of the organic chloride will be substantially completed by the time the mixture leaves the last coil 60.

From the last coil 60, which is preferably the hottest coil, the reaction products pass through one or the other of two filter presses 62 to the rectifying column 38 of Fig. 2. The material entering the coils 60 from the pump 61 and the products leaving the coil 60 may be passed through a heat interchanger 63 to conserve heat.

While the single-step process is the simpler of the two processes above described, it is not on that account necessarily the more desirable. As will be apparent from a comparison of Equations 2 and 3, the single-step process requires more of the base (sodium hydroxide, calcium hydroxide, etc.) than is required in the two-step process. Furthermore, in the single-step process all the chlorine removed from the trichloride becomes combined in the form of metallic chlorides, while in the two-step process relatively valuable hydrochloric acid is recovered from the pyrolysis step.

The processes described in detail above are intended to serve merely as examples of the utilization of our invention and we are not to be understood as limiting ourselves to them; for the same general results can be obtained in other ways apparent to those skilled in the art. We believe the method of preparing 3-chloro-2-methylallyl alcohol by treating a trichloroisobutane and/or a dichloroisobutene with a base in the presence of water to be novel. We intend the term "base" to include any material which in aqueous solution or suspension possesses the property of neutralizing acids and thus to include the alkali and alkaline earth carbonates. In the two-step process, we do not limit ourselves to the treatment of the dichloroisobutene with a base, as this compound can be hydrolyzed to form the desired 3-chloro-2-methylallyl alcohol by merely boiling it with water. Such a process, however, requires that the apparatus in which the hydrolysis is conducted be lined with material resistant to the concurrently formed hydrochloric acid.

The 3-chloro-2-methylallyl alcohol, which we obtain in the practice of our invention, has a boiling point of about 163°–164° C. and a density of about 1.111 grams per cubic centimeter at 20° C. It is a solvent for cellulose acetate and, because of its high boiling point and relatively low volatility is desirable for use as such in cellulose-acetate lacquers, either alone or in association with other cellulose-acetate solvents, in situations where it is desirable, as in brushing lacquers, to avoid too rapid a setting time. The chlorine is very stable as regards hydrolysis, probably because of the adjacent double bond, while the position in the homologous series is such that it will not readily dissolve water at ordinary temperatures. The odor is not lachrymatory in any ordinary concentration as might perhaps have been anticipated by analogy with allyl alcohol, but is extremely mild.

We claim as our invention:

1. A process for producing 3-chloro-2-methylallyl alcohol, comprising heating trichloroisobutane with water in the presence of a base capable of neutralizing the hydrochloric acid formed in the reaction.

2. A process for producing 3-chloro-2-methylallyl alcohol, comprising pyrolyzing a trichloroisobutane to form a dichloroisobutene, and then heating said dichloroisobutene with water in the presence of a base capable of neutralizing the hydrochloric acid formed in the reaction.

3. A process for producing 3-chloro-2-methylallyl alcohol, comprising pyrolyzing a trichloroisobutane to form a dichloroisobutene, and then heating said dichloroisobutene with water.

4. A process for converting trichloroisobutane to dichloroisobutene, comprising subjecting trichloroisobutane to pyrolysis, removing the hydrogen chloride formed during pyrolysis, and separating the dichloroisobutene from co-present material by rectification.

5. A process for producing 3-chloro-2-methylallyl alcohol, comprising subjecting trichloroisobutane to pyrolysis, removing the hydrogen chloride formed during pyrolysis, separating dichloroisobutene from the reaction products by rectification, and then heating said dichloroisobutene with water in the presence of a base capable of neutralizing the hydrochloric acid formed by hydrolysis of the dichloroisobutane.

6. A process for producing 3-chloro-2-methylallyl alcohol, comprising subjecting trichloroisobutane to pyrolysis, removing the hydrogen chloride formed during pyrolysis, separating dichloroisobutene from the reaction products by rectification, and then heating said dichloroisobutene with water.

7. A process of producing 3-chloro-2-methylallyl alcohol, which consists in heating trichloroisobutane and causing a base in the presence of water to enter the reaction, before any pyrolysis of the trichloroisobutane occurs.

8. A process of producing 3-chloro-2-methylallyl alcohol, which consists in heating trichloroisobutane and causing a base in the presence of water to enter the reaction after pyrolysis of the trichloroisobutane occurs.

9. A process of producing 3-chloro-2-methylallyl alcohol, which consists in heating trichloroisobutane and causing at least one of the chlorine atoms separated from each molecule to react immediately with a base in the presence of water.

RALPH E. NELSON.
ARTHUR O. ROGERS.